United States Patent [19]
Horn et al.

[11] 3,763,631
[45] Oct. 9, 1973

[54] METHOD AND APPARATUS FOR REMOVING ENTRAINED MATTER FROM CENTRIFUGAL FILTER MEDIA

[75] Inventors: Edward A. Horn; Irwin Miness; Henry R. Rosten, all of New York, N.Y.

[73] Assignee: Chemical Detergents Co., Inc., New York, N.Y.

[22] Filed: June 1, 1971

[21] Appl. No.: 148,606

[52] U.S. Cl. .......... 55/96, 55/97, 55/227, 55/233, 55/242, 55/400
[51] Int. Cl. .......... B01d 33/02
[58] Field of Search .......... 55/84, 87, 90, 91, 55/96, 97, 227, 233, 228, 242, 400, 524; 252/524, 529, 539, DIG. 14; 210/59, 60, 403

[56] References Cited
UNITED STATES PATENTS

| | | | |
|---|---|---|---|
| 1,717,412 | 6/1929 | Rowe | 55/227 |
| 1,814,864 | 7/1931 | Sinclair | 162/279 |
| 2,018,938 | 10/1935 | Wells | 162/5 |
| 3,239,863 | 3/1966 | Gardner | 101/425 |
| 3,265,625 | 8/1966 | Grob | 252/DIG. 14 |
| 3,281,367 | 10/1966 | Jones et al. | 252/DIG. 14 |
| 3,289,397 | 12/1966 | Schonewald et al. | 55/400 |
| 3,385,573 | 5/1968 | Gilman | 55/233 |
| 3,494,108 | 2/1970 | Moragne | 55/227 |
| 3,589,609 | 6/1971 | Wyant et al. | 55/227 |
| 3,242,652 | 3/1966 | Malenchini | 55/228 |
| 3,395,901 | 8/1968 | Moser | 55/233 |

FOREIGN PATENTS OR APPLICATIONS

| | | | |
|---|---|---|---|
| 867,343 | 2/1953 | Germany | 55/408 |
| 393,117 | 6/1933 | Great Britain | 55/231 |

OTHER PUBLICATIONS
Instruction Bulletin Dynopure Ink Mist Filter System, Goss Co., Chicago Illinois dated July 1967, pages 1–4.

*Primary Examiner*—Bernard Nozick
*Attorney*—McLean, Boustead and Sayre

[57] ABSTRACT

A method and apparatus for removing solid and liquid material entrained in the filter media of a centrifugal aerosol filtering system by periodically spraying a sufficient quantity of a solubilizing solution on the filter media to solubilize the entrained material thereby allowing it to pass through the filter media.

4 Claims, 2 Drawing Figures

EDWARD A. HORN
IRWIN MINESS
HENRY R. ROSTEN
INVENTORS

BY McLean, Boustead
& Jayre
ATTORNEYS

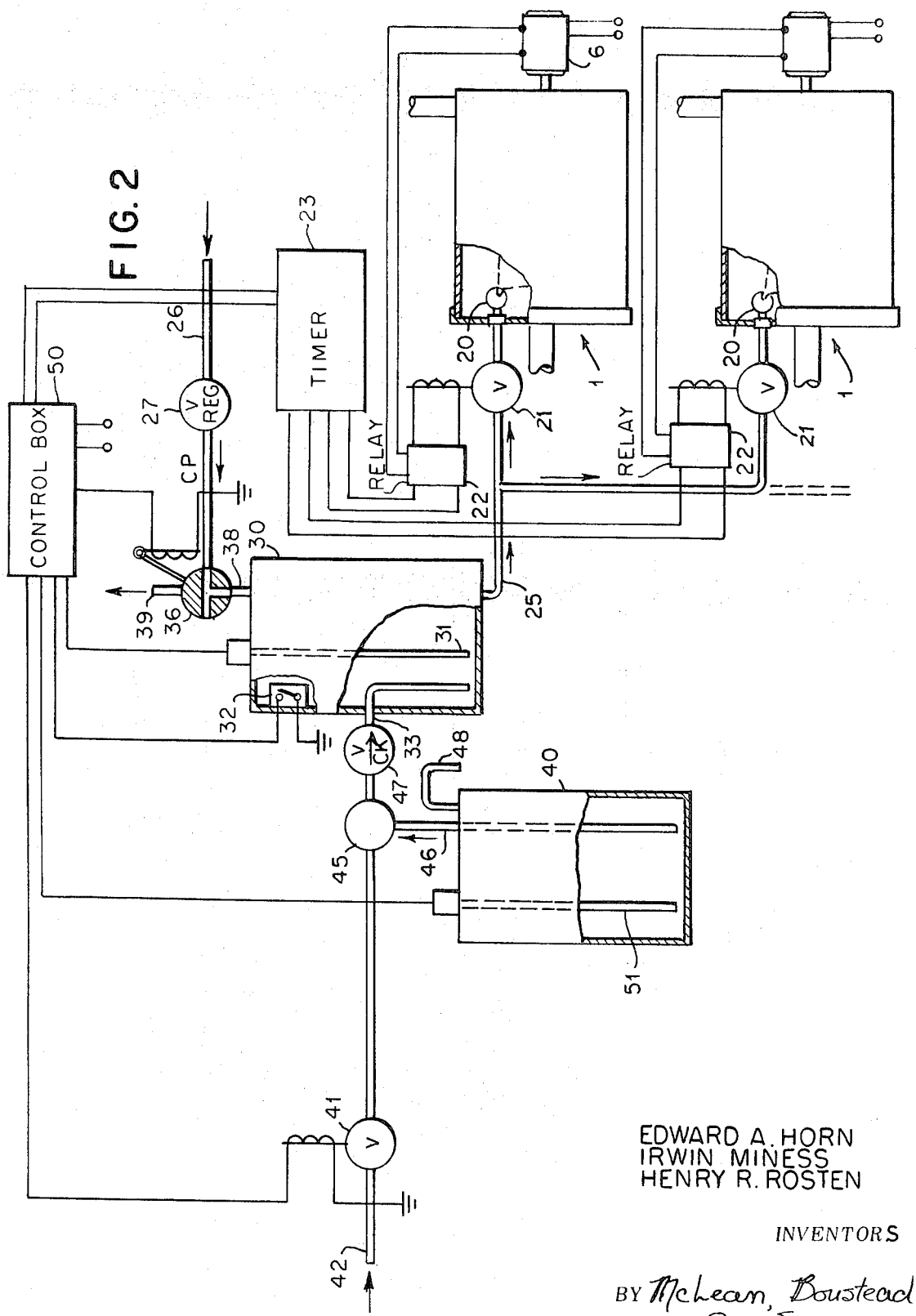

METHOD AND APPARATUS FOR REMOVING ENTRAINED MATTER FROM CENTRIFUGAL FILTER MEDIA

BACKGROUND OF THE INVENTION

1. Field of the Invention

The invention relates to a method and apparatus for removing entrained material, both solid and liquid, from the filtering media of a centrifugal pressure differential filter system utilizing a sufficient quantity of a solubilizing solution sprayed onto the rotating filter media to solubilize the solid material, thereby allowing it to pass completely through the filter media and be removed.

The invention has application wherever the solubilizing effect of a solution can be brought to bear on entrained particulate matter through the action of the centrifugal force of the rotating filter media and the centrifugal force can further act on the solubilized matter to force it through and out of the filter media.

2. Description of the Prior Art

In recent years considerable investments of time and money have been made in attempts to clean up industrial working environments, particularly with respect to the airborne pollutants or contaminants that are produced as a result of various industrial operations. These airborne pollutants often appear as aerosols in the form of smoke, fog or mists comprised of minute solid or liquid particles.

The printing industry, and in particular newspaper printing plants, have found it necessary to install air exhaust and filter systems not only to improve the working environment of the pressroom personnel, but to maintain the quality and appearance of the product and to avoid accumulations of ink mist on other materials or equipment, the removal of which present major housekeeping problems. The type of ink used in newspaper printing is comprised of mineral oil, rosins and/or resins, carbon black and color pigments or dyes.

Obviously, the most efficient method of keeping the industrial environment free of this form of contaminant is to capture the aerosol-laden air as close as possible to its source of production as by means of an exhaust or vacuum system and carry it away. In earlier times it might have seemed practical to simply discharge this exhaust stream into the atmosphere, but ecological considerations now militate against this means of disposing of the aerosolladen stream. Various types of mechanical filtering systems and electrostatic precipitators have been developed and are currently being used in industrial facilities to remove the suspended particles in exhaust air streams.

One particular type of apparatus that has been found useful in the printing industry to remove the objectionable ink mists which are generated during the high-speed printing process is the centrifugal filtering system. The system is comprised of a number of closed ducts in which a low pressure is maintained relative to ambient pressure in the vicinity of the press plates and blanket rolls. These ducts are secured to mist guard plates or shields which effectively enclose the printing presses, the ducts having a number of perforations or intake manifolds communicating with the interior airspace immediately adjacent to the printing plates. The other end of these collecting ducts communicate with means for producing the low pressure in the system.

A cylindrical perforated rotating drum containing a lining of filtering media is interposed between the open or collecting end of the duct and the lower pressure producing means. The aerosol-laden air stream from the vicinity of the presses enters the rotating filter assembly axially through the inlet duct and is centripetally accelerated towards the filter media. As the particles which form the aerosol pass through the filtering media there takes place a coalescing and merging of the particles to form droplets. These larger droplets are forced through the filter media and perforated drum and impinge upon an outer stationary cylindrical housing, thereupon settling under the influence of gravity, to the lowest point where the now liquid stream is collected. A more complete description of the construction and operation of this type of centrifugal filtering apparatus is to be found in U.S. Pat. No. 3,289,397, issued on Dec. 6, 1966 to Shonewald et al.

Ideally, the centrifugal filter media should be almost self-cleaning if the drum and filter media are permitted to rotate while a quantity of relatively clean purging air is drawn through the system. A more thorough cleaning of the filter media is accomplished periodically by removing it from the drum and soaking it in a solvent.

However, when these units were installed on newspaper presses it was found that the efficiency of the unit decreased at a much greater rate than had been estimated, i.e., the vacuum attained after a short period of operation was low, and also bearing assemblies of the rotating drum shaft wore extremely rapidly due to the out-of-balance condition of the drum resulting from dried accumulated material at the low point of drum when the device was shut down.

Attempts to eliminate these deficiencies in installed systems centered around the use of mineral or organic solvents to dissolve the accumulated dried ink, but in addition to being ineffective, these solvents presented a serious fire hazard not only within the unit itself but through the emission of solvent vapors into the general work area.

SUMMARY OF THE INVENTION

We have found that when the centrifugal filter system is installed for the collection of ink mists in the vicinity of high speed printing presses, particularly those used for the printing of newspapers, an appreciable amount of "paper dust" or cellulosic fibers are drawn into the collection manifolds.

When these cellulosic fibers are drawn into the centrifugal filter system they become coated with the ink mist, and it has been further found that within a relatively short period of time these coated cellulosic fibers become entrained in the filter media so as to reduce the porosity thereof, especially at the inner surface, and as the system continues in operation a layer or mat of cellulosic material and thickened ink builds up on this surface of the rotating filter media. The presence of this cellulosic material is not immediately apparent because of the minuteness of the individual particles and the fact that they are completely saturated with an oily coating of ink.

The method and apparatus of the present invention eliminates the problems of rapidly declining filter porosity and compaction due to this entrained solid particulate matter by the periodic application of a suitable solubilizing agent to the filter media while the centrifugal filter apparatus is operating. This operation is carried out while the apparatus is operating to take advantage of the centrifugal and pressure differential forces which are developed therein.

The apparatus provides for an automated spray cleaning system utilizing this specialized solubilizing agent for periodically cleaning these filters, eliminating the necessity of disassembly of the unit, increasing the life of the filter media, retaining the unit in balance, reducing mechanical failure, and maintaining the collection system within its operational design levels. In addition, the apparatus of the invention provides for the pressurized spraying of a measured quantity of the solubilizing agent at pre-determined intervals and only while the centrifugal filter unit is in operation. The solubilizing agent must be one that can first penetrate or remove the ink coating on the cellulosic matter, and then act on the cellulosic fibers to effectively dissolve them so that they are able to pass through the filter media and impinge on the stationary housing.

We have found that a solution of water and certain surface active agents, or surfactants, have the requisite physical properties for accomplishing the penetration or solubilizing of the ink coating and the subsequent solubilizing of the cellulosic fibers. Particularly satisfactory surfactant formulations for removing the ink coating and solubilizing the fibrous cellulosic material are those prepared from complex phosphates, together with an amine condensate of the fatty acid alkanolamide type, and a hydrotropic solubilizing agent in an aqueous solution.

The complex phosphates can be the sodium or potassium salts of tripolyphosphates, pyrophosphates, metaphosphates, tetraphosphates, or mixtures thereof. In addition to serving as wetting, solubilizing and dispersing agents, these salts form water soluble complexes with calcium and magnesium ions found in hard water and prevent the formation of insoluble salts which would tend to precipitate and thereby cause clogging of the spray nozzle. The amine condensate is that of the coconut fatty acid or the refined fraction of coconut oil or fatty acid (the socalled Kritchevsky condensate of a $C_{12}$–$C_{18}$ fatty acid) with an alkanolamine, such as ethanolamine, propanolamine, diethanolamine and the like; these are mixtures of alkanolamides with alkanolamine soaps of fatty acids; or the so-called "super" amides which are the alkanolamides in combination with alkanolamine soap. These compounds serve as foam boosters and to increase the viscosity and emolliency of the aqueous solution. The hydrotropic solubilizing agents can be the sodium, potassium or ammonium salts of toluene sulfonic acid, xylene sulfonic acid or benzene sulfonic acid, or mixtures thereof. The hydrotropes are used to solubilize the other ingredients in the concentrated aqueous formulation. Preferably, the formation comprises from about 2 percent to about 10 percent of the complex phosphate, and about 5 percent to about 15 percent of the amine condensate of the fatty acid alkanolamide type with from about 2 percent to about 10 percent of the hydrotrope, all of the above percentages based on weight, and the balance of the formulation being made up of water.

In addition to the aqueous medium provided in preparing the surfactant formulation an additional quantity of water must be added to prepare the solubilizing solution. Satisfactory results can be obtained using ratios of about four to about six to one of water to surfactant formulation, with a ratio of about five to one being preferred for the solubilization of cellulosic material in the black ink mist filtering system. In the actual practice of the invention in industrial applications the least expense will be incurred by shipping the surfactant formulation only in appropriate containers with the preparation of the solubilizing solution by addition of the required quantity of water being accomplished at the site of use.

While the above formulation has been found to be particularly effective as a solubilizing agent when mixed with additional quantities of water, other formulations can be prepared and utilized so long as they can first penetrate or remove the ink coating on the cellulosic matter and then act on the cellulosic fibers to effectively dissolve them so that they are able to pass through the filter media and impinge on the stationary housing.

Utilizing the method and apparatus of the invention it is unnecessary to shut down the centrifugal filter apparatus and remove the filter media for cleaning or replacement in order to maintain the efficiency of the filtering system at acceptable levels. Thus, conventional methods of cleaning the filter media, as by soaking in organic solvents and mechanical agitation which were incapable of removing the deeply entrained and matted cellulosic fibers are obviated, and the expense of maintenance as measured in terms of down time, material and labor costs will be greatly reduced.

In addition to maintaining the efficiency of the collection system, the periodic application of the solubilizing solution prevents the formation of deposits of condensed fluids which settle at the lowest point when the filter is idle, as at the end of a production run, and which cause severe vibrations upon restarting. Eliminating this vibration avoids damage to the drive motor bearings and avoids costly overhaul and parts replacement associated with mechanical failure that has been experienced in the past.

Under actual operating conditions, utilizing the methods and apparatus of the invention in conjunction with centrifugal filter units in a newspaper printing plant, it was found collection and filtering systems could be operated at near optimum conditions for over five times longer than other units installed on black ink presses without removing the filter media for manual cleaning. Furthermore, these tests indicate that use of the method and apparatus of the invention will avoid the necessity of the manual cleaning operation throughout the life of the filter media. In addition to maintaining the filter media free of entrained matter, the periodic application of the solution in accordance with the method of our invention prevents accumulations of ink-mist and cellulosic matter on the other rotating members comprising the filter unit, on the surrounding stationary drum, and, as a result of keeping the stream of aerosol moving at design velocities, in the manifolds and connecting ducts. When the method and apparatus was used on centrifugal filter units installed on color presses where the ink is comprised of varnish or shellac, mineral oil, resins, pigments and dyes, much improved filter efficiency was also found.

Thus, the object of this invention is to provide a method and apparatus for easily and efficiently removing solid matter entrained in the filtering media of a centrifugal filter.

In particular, the object of this invention is to provide a method and apparatus for removing cellulosic fibers and particles which are coated with liquid printing ink, which fibers and particles are entrained in the filter media of an apparatus that forms a part of an ink-mist filter system for use in conjunction with high speed printing press units.

A further object is to provide a method and apparatus whereby the overall operating life of the centrifugal filter apparatus can be prolonged by preventing the formation of an unbalanced condition in the rotating filter assembly and thereby avoiding rapid wear and breakdown of the bearings from tortional strain.

A still further object of this invention is to provide a method and apparatus for removing entrained matter from the filter media which does not involve the shutting down of the centrifugal filter apparatus and the removal of the filter media.

An additional object of this invention is to provide a method and apparatus for treating the filter media that will permit the centrifugal filter apparatus to operate at close to designed efficiency for prolonged periods in collecting and removing from an aerosol stream small particles of cellulosic material and ink.

DETAILED DESCRIPTION OF THE INVENTION

Referring to the drawings in which like reference numbers are used to identify the same parts appearing in the several figures:

FIG. 2 is a schematic view of the major components of the apparatus comprising the invention used in conjunction with a number of centrifugal filter units.

Figure 1:
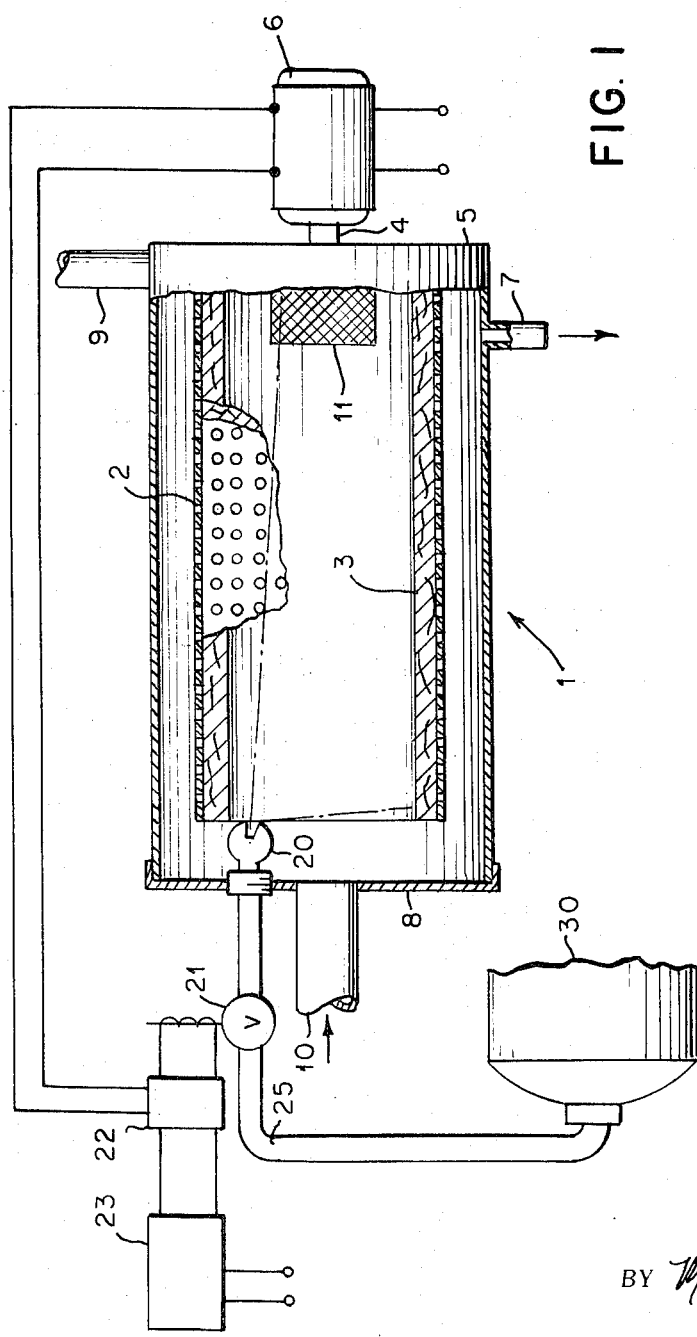
FIG. 1 is a side elevational view partly in section showing a preferred embodiment of the invention.

In FIG. 1 there is illustrated a centrifugal filter unit 1, which is comprised of the stationary cylindrical housing 5, with drain tube 7 and outlet duct 9. Affixed to housing 5 is drive motor 6 which drives shaft 4 to which perforated rotating drum 2 and pressure differential producing means 11 are attached. Porous filter media 3, shown disposed on the inner surface of said rotating drum 2, is typically a foamed plastic, such as polyurethane, or of dacron or pre-shrunk cotton, which are porous, resilient and flexible. Stationary housing 5 is closed by removable end cover 8 with inlet duct 10 centrally located therein. Pressure differential producing means 11 is typically a squirrel cage-type fan which draws the aerosol laden stream in through duct 10 axially and causes it to be dispelled through the rotating drum 2 and filter media 3 where the soil and solubilizing liquid are collected into drain tube 7 and the air is exhausted through outlet duct 9.

Communicating with the interior of filter unit 1, is nozzle 20, which is disposed radially from the axis of the rotating drum and outside the periphery of the opening of inlet duct 10 in the end cover 8. It is desirable to position nozzle 20 out of the line of the axial flow of the aerosol stream entering through inlet duct 10 to avoid the excessive accumulation of material on the nozzle and lead-in assembly during operation and the possibility of this accumulation falling onto the filter media when the unit is shut down. The use of a slotted-type nozzle fitting in which the orifice is slightly recessed is preferred to avoid the build-up and clogging of the nozzle tip by material in the aerosol stream. Nozzle 20 must be disposed so that the spray emanating therefrom will cover all of the inner surfaces of the rotating drum 2 and filter media 3 during operation. This will also provide for the spraying of fan means 11.

Nozzle 20 is connected to conduit 25 which in turn communicates with a source of pressurized solubilizing solution in container 30. Interposed in line 25, adjacent nozzle 20 is solenoid valve 21, which is normally closed.

Solenoid valve 20 is shown connected through relay 22, to timer control 23. Relay 22 is connected to motor 6 to insure that solenoid 21 will not be activated except while filter unit 1 is in operation.

Timer control 23, which may be of any suitable type well-known in the art, may be variably set both with respect to the frequency of the spraying operation and the duration thereof. The duration of the spray, of course, determines the quantity of solubilizing solution which is sprayed onto the filter media. These time factors will generally be determined by the actual operating conditions and the type of equipment that the apparatus is used with. Parameters that will effect the quantity of solution required during each spraying operation are the porosity, density and thickness of the filtering material, the concentration of matter, especially cellulosic material, in the aerosol stream, and the time lapsed between spraying operations. During an experimental test of the invention in conjunction with a centrifugal filter system on high-speed newspaper printing presses it was found that a spray discharge of about three ounces of solubilizing solution every 45 minutes was adequate to keep the filter media free of accumulated material.

As shown in FIG. 2 pressure tank 30 is connected by line 33 to fluid proportioner 45, which in turn is connected through solenoid valve 41 to water line 42 and also to suction inlet tube 46. Proportioner 45 is of the venturi suction type wherein the flow of pressurized water creates a suction at the inlet tube 46 to draw and mix with the water stream the concentrated solubilizing agent from resevoir 40, which is typically a shipping drum. Pressure tank 30 is connected by line 25 through solenoid valves 21 to spray nozzles 20 which communicate with the interior of centrifugal filter units 1. The pressure tank is also connected by line 38, through double acting solenoid valve 36 to vent tube 39 and pressure regulating valve 27. Shipping drum 40 is fitted with low-level fluid sensing device 51, and pressure tank 30 is fitted with high and low level fluid sensing device 31, and pressure switch 32.

Solenoid valves 36 and 41, pressure switch 32, and fluid level sensing devices 31 and 51 are connected by appropriate circuitry to control box 50, as is timer 23.

The sequence of operations of the apparatus shown in the figures is controlled by a number of standard relays interconnected by conventional means and which are contained in the control box 50.

The following sequence of events will serve as an illustrative example of the functioning of the automated system for resupplying solubilizing solution to the pressure tank 30 when it has been emptied during normal operations. When fluid low-level sensing device 31 indicates that the fluid in tank 30 has dropped below a predetermined level a relay in control box 50 opens the circuit to timer 23, activates double acting solenoid valve 36 to open line 38 to vent tube 39 thereby cutting off the source of pressurized air from regulator 27 and releasing the pressurized air from tank 30. When the air pressure in tank 30 reaches atmospheric pressure switch 32 closes to a relay in control box 50 which in turn opens solenoid valve 41 to plant water line 42. The stream of pressurized water passing through proportioner 45 draws solubilizing agent from drum 40 which is introduced into tank 30 through line 33. When the fluid in tank 30 reaches a predetermined point on high level sensing device 31, a signal is transmitted to a relay in control box 50 which closes solenoid valve 41, activates solenoid 36 closing line to vent tube 39 and opening line 38 to pressurized air line 26 through regulator 27. When the pressure in tank 30 has reached the predetermined operating level, pressure switch 32 opens and a relay in control box 50 reactivates the timer 23. The system is then in condition for the next programmed spraying operation as determined by the timer 23.

In addition to the above described connections, the low leval sensing device 51 in drum 40 is connected to appropriate signalling means, such as a light or audible alarm which can be conveniently located in control box 50 to alert operating personnel that the fluid drum 40 has reached the predetermined level and that the drum 40 should be replenished or replaced with a full drum. The system is automatically shut down until replenishment or replacement with a full drum is accomplished.

We claim:

1. In a centrifugal filtering unit which comprises a stationary housing, a rotatable perforated cylindrical drum having one open end, axially mounted within the housing, motor means for rotating the drum, a cylindrical porous filtering media interior of, and supported by the drum, an axial inlet duct connected to the housing and communicating with the interior of the open end of the drum and housing through which inlet duct a gaseous stream containing liquid aerosol particles and finely divided cellulosic material is introduced into the open end of the rotating drum, gas outlet means for discharging the filtered stream, and means for collecting the material removed from the gaseous stream, the improvement comprising spray means communicating with the interior of said stationary housing and the inner surface of the filter media for applying a spray of solubilizing solution to the interior surface of the filter media, the spray means being displaced radially from the periphery of the axial inlet duct, and substantially out of the path of flow of the incoming gaseous stream, means for periodically delivering a quantity of the solubilizing solution to the spray means comprising electrically activated valve means and timer control means, and means for delivering pressurized solubilizing solution to said valve means comprising a closed vessel having inlet and outlet means, high and low level liquid sensing means, means for reducing the pressure in the vessel to atmospheric pressure, and means responsive to the high and low level sensing means and the pressure sensing means for introducing into the vessel a proportioned stream of liquids and a stream of pressurized gas.

2. In the method of removing suspended fine solid and liquid particulate materials from a gaseous stream comprising drawing the particulate containing gaseous stream through an axial inlet duct at one end of a stationary housing, and passing the gaseous stream through a supported cylindrical porous filter media from the interior to the exterior axially rotated within the housing whereby the particulate materials are entrained in the filter media, and discharging the filtered gaseous stream through an outlet in the housing, the improvement which comprises spraying the interior surface of the filter media with a solubilizing solution of water and a surfactant formulation comprised of from about 2 percent to about 10 percent of a complex phosphate, from about 5 percent to about 15 percent of an amine condensate of a refined fraction of coconut fatty acids having from twelve to eighteen carbon atoms with an alkanolamine and from about 2 percent to about 10 percent of a hydrotropic agent, where all percentages are by weight and the balance of the formulation is water, said solubilizing solution being sprayed from a position out of the flow of the incoming gaseous stream and in a quantity sufficient to dissolve and solubilize the entrained material which solution and dissolved material then passes through the filter media under the combined effects of the centrifugal acceleration forces and the pressure differential across the filter media.

3. The method of claim 2 where the surfactant formulation is comprised of from about 2 percent to about 10 percent of a complex phosphate selected from the group consisting of the sodium or potassium salts of tripolyphosphates, pyrophosphates, metaphosphates, and tetraphosphates; from about 5 percent to about 15 percent of an amine condensate of the Kritchevsky type with a refined fraction of coconut fatty acids having 12 to 18 carbon atoms where the amine is selected from the group of alkanolamines consisting of ethanolamine, propanolamine and diethanolamine; and from about 2 percent to about 10 percent of a hydrotropic agent selected from the group consisting of the sodium, potassium or ammonium salts of toluene sulfonic acid, and benzene sulfonic acid, where all percentages are by weight and the balance of the formulation is water.

4. The method of claim 3 where the complex phosphate is sodium tripolyphosphate, the amine condensate is a diethanolamine condensate of the Kritchevsky type with a refined fraction of coconut fatty acids having 12 to 14 carbon atoms, and the hydrotropic agent is sodium xylene sulfonate.

* * * * *